(12) United States Patent
Burke

(10) Patent No.: US 6,477,753 B1
(45) Date of Patent: Nov. 12, 2002

(54) SEAT BELT BUCKLE

(75) Inventor: David Burke, Carlisle (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/554,360

(22) PCT Filed: Nov. 17, 1998

(86) PCT No.: PCT/GB98/03454

§ 371 (c)(1),
(2), (4) Date: May 12, 2000

(87) PCT Pub. No.: WO99/25214

PCT Pub. Date: May 27, 1999

(30) Foreign Application Priority Data

Nov. 17, 1997 (GB) ............................................. 9724303

(51) Int. Cl.$^7$ ............................................... A44B 11/26
(52) U.S. Cl. ............................ 24/637; 24/633; 24/636; 24/303
(58) Field of Search ................. 24/630–640; 280/801.1, 280/802

(56) References Cited

U.S. PATENT DOCUMENTS

| 3,570,621 | A | * | 3/1971 | Hampton | 180/270 |
| 4,661,806 | A | * | 4/1987 | Peters et al. | 340/568 |
| 4,702,492 | A | * | 10/1987 | Andres et al. | 280/801.1 |
| 5,060,977 | A | * | 10/1991 | Saito | 24/303 X |
| 5,117,097 | A | * | 5/1992 | Kimura et al. | 235/439 |
| 5,394,955 | A | * | 3/1995 | Howard | 180/273 |
| 5,454,591 | A | | 10/1995 | Mazur et al. | |
| 5,774,043 | A | * | 6/1998 | Mizuno et al. | 340/426 |
| 5,783,871 | A | * | 7/1998 | LeMense | 307/10.1 |
| 5,851,025 | A | * | 12/1998 | Gamboa | 24/633 X |
| 5,871,063 | A | * | 2/1999 | Young | 24/641 X |
| 6,025,653 | A | * | 2/2000 | Hayashi et al. | 290/33 |
| 6,076,239 | A | * | 6/2000 | Kopetzky et al. | 24/633 |

FOREIGN PATENT DOCUMENTS

| DE | 43 27 341 A | | 2/1995 |
| DE | 44 26 677 A | | 2/1995 |
| EP | 0 819 566 A | | 1/1998 |
| EP | 0 842 832 A | | 5/1998 |
| EP | 0 870 653 A | | 10/1998 |
| FR | 2 742 110 A | | 6/1997 |
| GB | 2 236 419 A | * | 4/1991 |
| IT | 0 449 132 A3 | * | 10/1991 |

* cited by examiner

Primary Examiner—Robert J. Sandy
Assistant Examiner—Ruth C. Rodriguez
(74) Attorney, Agent, or Firm—Markell Seitzman

(57) ABSTRACT

The present invention provides an improved buckle for a vehicle safety restraint from which more accurate and reliable information on seat belt usage can be obtained. The buckle comprises a buckle head with a passageway for receiving a buckle tongue, and releasable means for locking the tongue in the passageway. A tag such as a coded magnetic strip or a microchip is provided encapsulated in the material of the tongue and a detector is provided in the buckle head in close proximity to the tongue passageway. A detector is provided to suitably read the tag code.

9 Claims, 2 Drawing Sheets

SEAT BELT BUCKLE

BACKGROUND AND SUMMARY OF THE INVENTION

The present invention relates to a buckle for a vehicle safety restraint seat belt.

In modern vehicles there is often a requirement to sense whether a seat belt is employed and if not to provide warning lights and/or audible signals to encourage the vehicle occupant to use the seat belt. Deployment of the belt is usually detected by a switch such as a reed switch in the buckle body which is sensitive to the proximity of a tongue inserted in the receiving passage of the buckle head.

There is a further requirement in modern safety restraint systems to sense the information about seat belt deployment, and vehicle occupancy in microcomputer controlled systems. For example it may be desirable to disable an airbag or a seat belt pretensioner if the belt is not deployed, or the timing of airbag deployment may be different depending upon whether the belt is worn. Certain crash conditions may also be taken into account.

A disadvantage of known systems of detecting the deployment of a seat belt is that they can not distinguish between the seat belt tongue itself and other foreign bodies spuriously inserted (or having fallen) into the buckle opening. Thus a false indication of usage may occur. In particular they cannot distinguish between tongues and will provide wrong information if for example, the passenger's tongue is inserted in the driver's buckle.

The present invention aims to provide an improved buckle from which more accurate and reliable information on seat belt usage can be obtained.

According to one aspect of the present invention there is provided a safety restraint seat belt arrangement comprising a buckle head, and a buckle tongue, the buckle head comprising a passageway for receiving the tongue, and releasable means for locking the tongue in the passageway, and wherein a tag is provided in the tongue and a detector, sensitive to the tag is provided in the buckle head in proximity to the tongue passageway.

The tag may be a coded magnetic strip, or a microchip embodying a code, encapsulated in the material of the tongue (which is usually metal but may be any strong material). The detector is chosen to be suitable to read the tag. The code may be arranged to uniquely identify each tongue in a particular vehicle or be programmable by the sensor at the vehicle manufacturer. Each detector in the buckle heads may be programmed to recognise its corresponding correct tongue and warning signals may be provided if the wrong tongue, or a different object is inserted into a particular buckle. The tags may be encapsulated to prevent damage during normal buckle usage.

Alternatively the tags may be optically coded, with light sensitive detectors in the buckle heads. For example a form of bar code and bar code reader would be a relatively cheap way of implementing the present invention.

Such a system can also be arranged so that substandard spare parts such as replacement tongues are rejected since the detector in the buckle will only recognise a tongue with the correctly coded tag installed.

In one embodiment, a specially coded tag would be used in tongues for child or baby seats and the sensor signals used to disable an associated airbag as a consequence, since airbags can be dangerous to infants, particularly when a rear facing baby seat is installed.

In another aspect the invention also provides a buckle tongue for use in the buckle of the first aspect, and which comprises an identifying coded tag.

According to a preferred embodiment the buckle further comprises a lock out device which prevents locking of the tongue in the buckle head unless the correct tongue is presented in the passageway. For example, the lock out device may comprise a sliding plate interposed between the movable buckle locking member and the tongue, to block engagement of the locking member with the tongue, (usually with a recess in the tongue).

BRIEF DESCRIPTION OF THE DRAWINGS

For a better understanding of the present invention and to show how the same may be carried into effect, reference will now be made to the accompanying drawings in which.

DETAILED DESCRIPTION OF THE DRAWINGS

Figure 1:
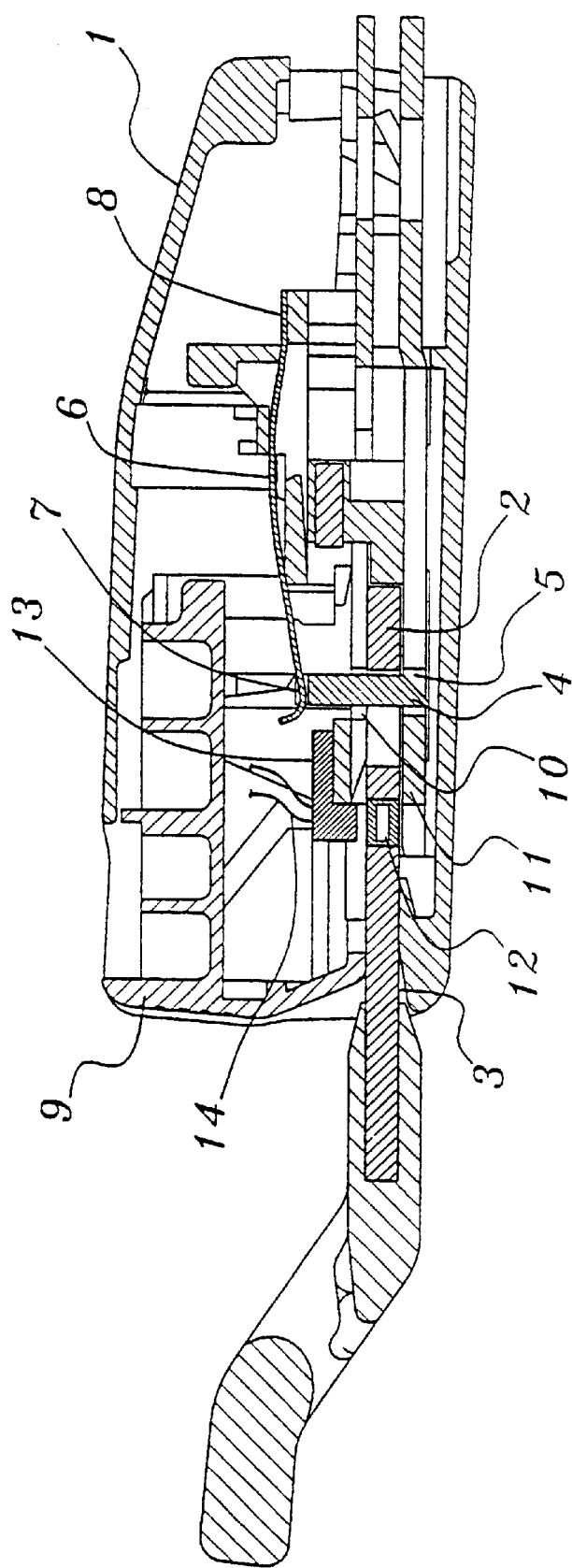
FIG. 1 as a cross section of a buckle according to the present invention with a tongue inserted.

In the Figures, the buckle is shown with a buckle body 1 and a tongue 2 inserted in a longitudinal passageway 3 in the lower part of the buckle body 1. A lockplate 4 engages (in FIG. 1) in a recess 5 in the tongue 2 to latch the tongue into engagement with the buckle body, to securely restrain the vehicle occupant. The lockplate 4 slides, transversely with respect to the tongue, in a guide channel 10 in the frame 11 of the buckle body. It is biased into the latching position which is down as seen in FIG. 1 by a leaf spring 6 resting on the top of the lockplate at its one end 7 and fixed to the frame at its other end 8.

To disengage the lockplate 4 from the tongue recess 5, a manually operable button 9 is provided at one end of the buckle body 1. This button 9 slides longitudinally in the buckle frame 11 and ramps (not seen in the Figures) engage side extensions of the lockplate 4 and lift it out of engagement with the tongue, against the action of spring 6.

Encapsulated in the tongue 2 is an electronic tag 12 which is programmed (or programmable) with a unique identifying code or identification for the tongue and for the vehicle or manufacturer if desired.

A sensor, or reader unit 13 is fitted to the frame 11 adjacent the passageway 3 in close proximity to the position of the tag 12 when the tongue 2 is inserted in the buckle body. The sensor 13 is connected, via wires 14, to a system control computer, or microprocessor (20). The microprocessor processes the signals from the sensor 13 and other signals such as from pressure sensors in seats, and from crash sensors, and issues appropriate signals to provide warning signs if necessary or to disable or enable secondary safety restraints such as airbags and pretensioners, or provide timing signals to them, as appropriate to the circumstances and the vehicle characteristics.

Figure 2:
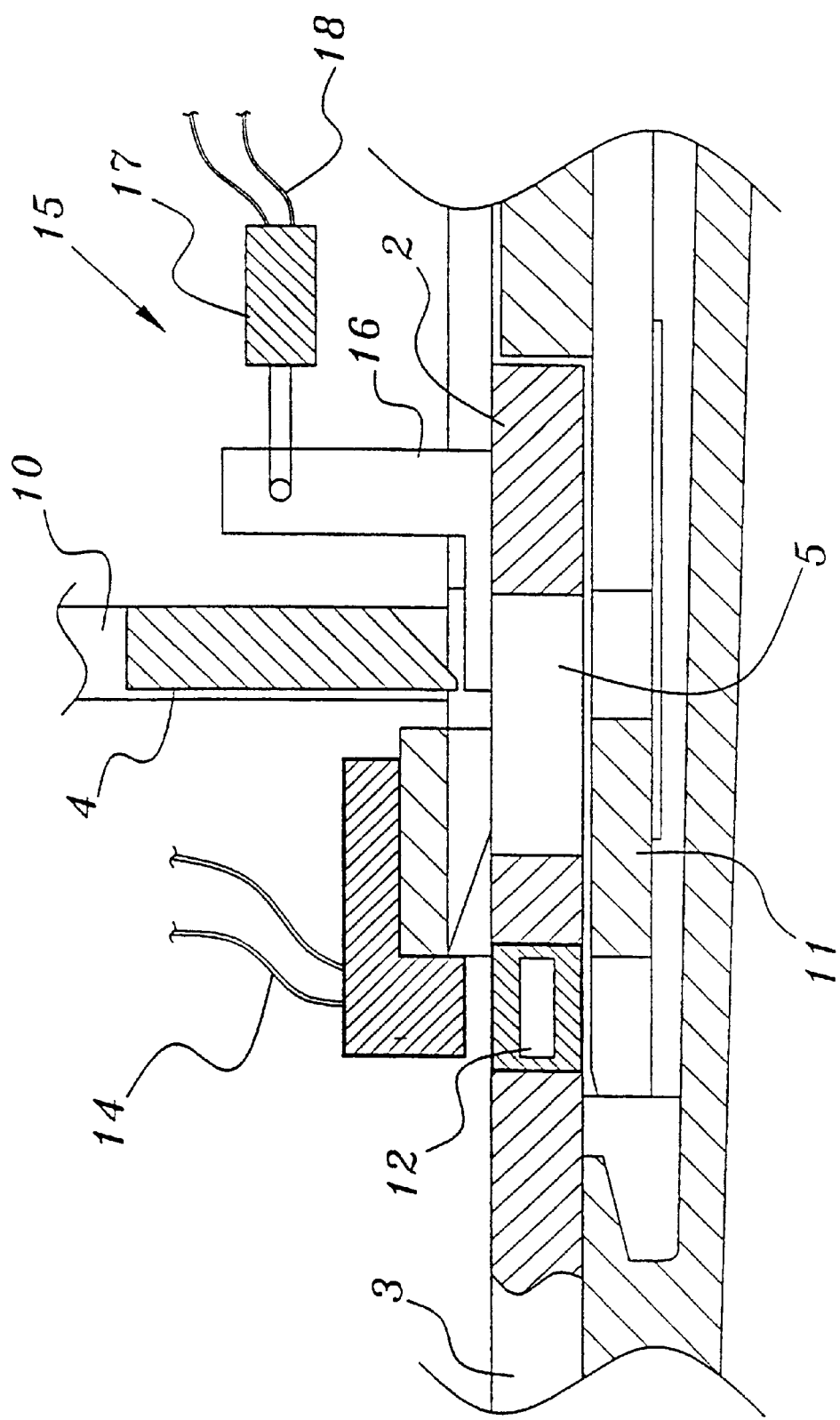
FIG. 2 is a cross section of part of the buckle of FIG. 1 showing, in more detail, a preferred embodiment of the invention.

In FIG. 2, a modification is shown in which a lockout device 15 installed. This lockout device 15 comprises a sliding plate 16 extending into the guide channel 10 between the lockplate 4 and the passageway 3, to prevent the lockplate 4 engaging the tongue in the passageway 3. The plate 16 is controlled by actuator 17 which receives control signals via wires 18 from the sensor 13, either directly or via the vehicle system computer or microprocessor. When the control signal indicates that the correct tongue is present in the passageway 3, i.e. when the appropriate tag 12 is recognised, then the actuator 17 pulls the plate 16 out of the guide channel 10 allowing the lockplate 4 to move down the channel 10 and engage the tongue recess 5. This may also be used to phase the engagement of the lockplate with the tongue recess, i.e. to ensure that the lockplate only moves to engage the tongue when the recess is in the correct position. Thus the buckling action will be smoother and more certain, and wear on the lockplate, and on the tongue is reduced.

FIG. 2 also shows a warning device such as a bell or light 22 which is activated directly by the sensor 12 or by the system control computer or microprocessor 20.

What is claimed is:

1. A safety restraint seat belt arrangement comprising a buckle head, and a buckle tongue, the buckle head comprising a passageway for receiving the tongue, and releasable means for locking the tongue in the passageway, and wherein a tag is provided in the tongue and a detector, sensitive to the tag is provided in the tongue in proximity to the tongue passageway;

wherein a unique predetermined code is embodied in a tag in a tongue for an infant seat which identifies the tongue as a tongue associated with the infant seat, wherein the code is effective in controlling the operation of an associated safety restraint.

2. A buckle according to claim 1 wherein the tag embodies a coded magnetic strip.

3. A buckle according to claim 1 further comprising a lock out device which inhibits locking of a false tongue in the buckle head.

4. A buckle according to claim 1 wherein the lock out device comprises a sliding plate interposed between the buckle locking member and the tongue to block engagement of the locking member whit the tongue.

5. A buckle according to claim 1 wherein the signal from the detector is supplied to a vehicle airbag system to disable the airbag in the seat corresponding to the infant seat.

6. A buckle according to claim 1 wherein the code is optically embodied in the tag and the detector comprises a light sensitive detector.

7. A buckle according to claim 6 wherein the code is in the form of a bar code.

8. A buckle according to claim 1 wherein the detector is provided in the buckle head.

9. A safety restraint seat belt arrangement comprising a buckle head, and a buckle tongue, the buckle head comprising a passageway for receiving the tongue, and releasable means for locking the tongue in the passageway, and wherein a tag comprising a microchip is provided in the tongue and a detector, sensitive to the tag is provided in proximity to the tongue passageway;

wherein the detector is provided in the buckle head.

* * * * *